Patented Jan. 10, 1928.

1,655,940

UNITED STATES PATENT OFFICE.

JEAN D'ANS, OF BERLIN, AND FRITZ SOMMER, OF CHARLOTTENBURG-BERLIN, GERMANY.

PROCESS OF PREPARING TITANIC OXIDE FROM TITANIC ORES.

No Drawing. Application filed April 28, 1923, Serial No. 635,319½, and in Germany December 14, 1921.

This invention has reference to a process of obtaining titanic oxide from titanium containing ores and other raw material, and it is in particular intended to provide means for the economical employment and for the recovery of the sulphuric acid used in the decomposition of the ores or the like. In the treatment of titanic ores for the manufacture of titanic oxide sulphuric oxide is mostly employed as a means of decomposition. As heretofore practised, it was not possible to recover the sulphuric acid of which large quantities had to be employed in the decomposition, and which greatly interfere with the economical working of the process, in a readily utilizable or high-grade condition, and to cause it to re-enter the cycle of procedure in the manufacture of titanic oxide.

According to our invention it is possible to obtain titanic oxide solutions which, if submitted without dilution to a splitting process under pressure, yield mother liquors containing about 40 per cent of sulphuric acid and only small amounts of iron. This object is accomplished by carrying on the decomposition of the titanic oxide ore in such quantities of liquid that a titanium solution is obtained, while iron sulphate itself remains undissolved or is removed by crystallization effected upon cooling the hot solution of the decomposed raw material. The about 40 per cent strong sulphuric acid resulting from this pressure treatment may now be enriched with sulphuric acid which may be readily produced in the well known manner for instance by the roasting of the sulphate of iron obtained, so that the sulphuric acid becomes again adapted for the treatment of the titanic ores. It is only necessary to supply the unavoidable small mechanical losses of sulphuric acid.

The process is preferably carried out by first treating the titanic ores with sulphuric acid, the resulting product being then dissolved by means of the mother liquors obtained in previous stages of the working of the process in such a manner that the larger portion of the iron is crystallized out as iron sulphate on cooling. The mother liquor which is thereby obtained and which is poor in iron is submitted to decomposition in the autoclave, and the sulphuric acid resulting therefrom which only contains small amounts of iron, but no titanium, is utilized for the absorption of the sulphuric acid anhydride obtained in the roasting of the dried ferrous-sulphate, and also for the absorption of the sulphuric acid anhydride produced from the sulphur-dioxid obtained by the roasting of the ferrous-sulphate, after oxidizing the same by a contact process. The $SO_3$ thus obtained either directly or indirectly from the ferrous-sulphate is sufficient to enrich the mother liquor from the autoclave in sulphuric acid to such an extent that it may be used over again for the decomposition of new portions of titanic ores. Evidently one may also proceed by using a cold mother liquor, saturated with ferrous-sulphate for the extraction of the decomposed ore, instead of dissolving it hot, the cold extraction being carried on so as to cause only the titanium salt to be dissolved. Then the iron may also be eliminated from the cycle of liquids only after the precipitation of the titanium in the autoclave, when those liquids have been enriched with sulphuric acid. Iron sulphate is well known to be difficultly soluble in concentrated sulphuric acid.

In case the titanium solutions should contain trivalent iron it should be converted into bivalent iron before the splitting and in accordance with the usual methods. For this purpose either the electrolytic reduction or the reduction by means of metallic iron are best adapted, because they do not introduce any foreign matter into the liquor, so as to avoid the possible accumulation of foreign matter in the cycle which the liquor undergoes in accordance with this invention. The iron sulphate thus obtained contains a large proportion of the sulphuric acid introduced into the decomposed ore in an easily recoverable and available condition.

The process according to this invention may obviously with corresponding charges, be also carried out if a certain portion of the iron has already been removed from the titanic ores by any other methods, such as for instance by chlorine and hydrochloric acid. In such case it is sometimes not necessary to remove the ferrous sulphate at every cycle of the sulphuric acid action.

*Example I.*

About one thousand kilograms of titanium-iron-ore are mixed with about two-thousand kilograms of concentrated sulphuric acid, and are decomposed by heating to fusion. After a certain amount of cooling but while still hot the fused mass is dissolved in about one thousand kilograms of water, the solution is allowed to settle, and is submitted to a reduction operation. By cooling the solution about 1500 kilograms of ferrous-sulphate may be separated out. The mother liquor is decomposed in the autoclave, and the resulting sulphuric acid which is free from titanium and which still contains only a few per cent of iron sulphate, is enriched with sulphuric acid in the manner described, and may be used for another treatment.

In order to carry on the removal of the disturbing admixtures of iron still further, it has been found to be of advantage to carry on the hydrolytic decomposition at an increased temperature under pressure. In accordance with the invention it has been found that titanic oxide free from iron may also be separated from the liquors obtained from the decomposed mass containing large amounts of iron, by heating the solutions which should contain less than 5 per cent of the total amount of titanium as trivalent titanium up to temperatures of about 150 to 210 degrees C., under pressure. The titanic oxide thus obtained is substantially free from iron. In this hydrolytic decomposition under pressure there is the further advantage of an increase in the yield of titanic oxide, because the loss is trivalent titanium compounds which are not precipitated in the hydrolytic decomposition, is only slight, while the amount of reduction agents required is decreased.

*Example II.*

The procedure of operation is the same as in the previous Example I with the difference, however, that the splitting in the autoclave is carried out at temperatures over 210 degrees C.

The titanic oxide obtained in accordance with the process described presents the further advantage that there is no necessity of highly heating it when the oxide is converted into a well coating color pigment which is not affected by light. Careful heating to temperatures below 850 degrees C. is sufficient.

Any small amounts of sulphuric acid still adhering to the titanium oxy-hydrate or oxide obtained by hydrolysis, and which, as is well known, have a decomposing action upon oils and varnishes even in the dark, thereby producing yellow coloration, are preferably removed in one of the stages of the process according to any well known method.

The titanium oxide thus obtained which is of excellent covering and coating qualities is particularly well adapted for admixture with other substances of inferior covering qualities for the manufacture of white and colored pigments.

The invention has been described in its broad aspects, but it is to be understood that it is capable of alterations and modifications within the scope of the claims, so as to adapt the same to varying conditions of application.

We claim:

1. The process of producing titanium oxide from a titanium ore containing iron, which comprises reacting upon such ore with concentrated sulphuric acid, in the proportions of substantially one part of ore to two parts of sulphuric acid and thereafter subjecting the reaction mixture to thorough contact with water in the proportion of substantially one part of water to each part of ore treated, subjecting the solution to a reducing agent to reduce the ferric sulphate to ferrous sulphate, eliminating ferrous sulphate by crystallization from the solution, and thereafter subjecting the mother liquor therefrom to a temperature above 150° C. in an autoclave under pressure to precipitate the titanium oxide.

2. The process of producing titanium oxide from a titanium ore containing iron, which comprises reacting upon such ore with hot concentrated sulphuric acid, in the proportions of substantially one part of ore to two parts of sulphuric acid, and thereafter subjecting the reaction mixture to thorough contact with water in the proportion of substantially one part of water to each part of ore treated, subjecting the solution to a reducing agent to reduce the ferric sulphate to ferrous sulphate, eliminating ferrous sulphate by crystallization from the solution, thereafter subjecting the mother liquor therefrom to a temperature of at least 150° C. in an autoclave under pressure to precipitate the titanium oxide, and adding concentrated sulphuric acid to the mother liquor to enable it to be used for another treatment.

In testimony whereof we affix our signatures.

JEAN D'ANS.
FRITZ SOMMER.